April 1, 1947.  E. MARTIN ET AL  2,418,418

ALUMINUM PROPELLER BLADE WITH STEEL SHANK

Filed Dec. 11, 1943

Erle Martin
Glen T. Lampton
Edwin E. Vincent
INVENTORS

BY John C. Kerr

ATTORNEY

Patented Apr. 1, 1947

2,418,418

UNITED STATES PATENT OFFICE 2,418,418

ALUMINUM PROPELLER BLADE WITH STEEL SHANK

Erle Martin and Glen T. Lampton, West Hartford, Conn., and Edwin E. Vincent, Springfield, Mass., assignors to United Aircraft Corporation, Hartford, Conn., a corporation of Delaware Application December 11, 1943, Serial No. 513,870

1 Claim. (Cl. 170—173)

This invention relates to propellers for airplanes and more particularly to the instrumentalities by which a propeller blade portion is united with a shank portion in the production of a complete blade.

One object of the present invention is to provide a construction for an aluminum alloy blade with a steel shank.

Another object of the invention is to provide a novel and efficient joint between an aluminum alloy blade and a steel shank.

A further object of the invention is to provide a joint between a blade and a shank therefor which may be readily assembled either in the factory or in the field.

It is also an object of the invention to provide a joint between a blade portion and a shank portion which is so constructed and arranged as to resist forces tending to separate them.

Yet another object of the invention is to provide a joint between the blade portion and the shank which can be assembled in the field solely by difference in temperature between the respective parts.

A still further object of the invention is to provide a joint of the character described in which the uniting or interlocking element between the blade portion and the shank portion is so constructed and arranged as to facilitate assembly between the parts but resists disassembly.

The invention also provides a threaded connection or joint between the blade portion and the shank portion such that the tendency of the blade to go into a lower pitch will result in tightening the joint.

Figure 1:
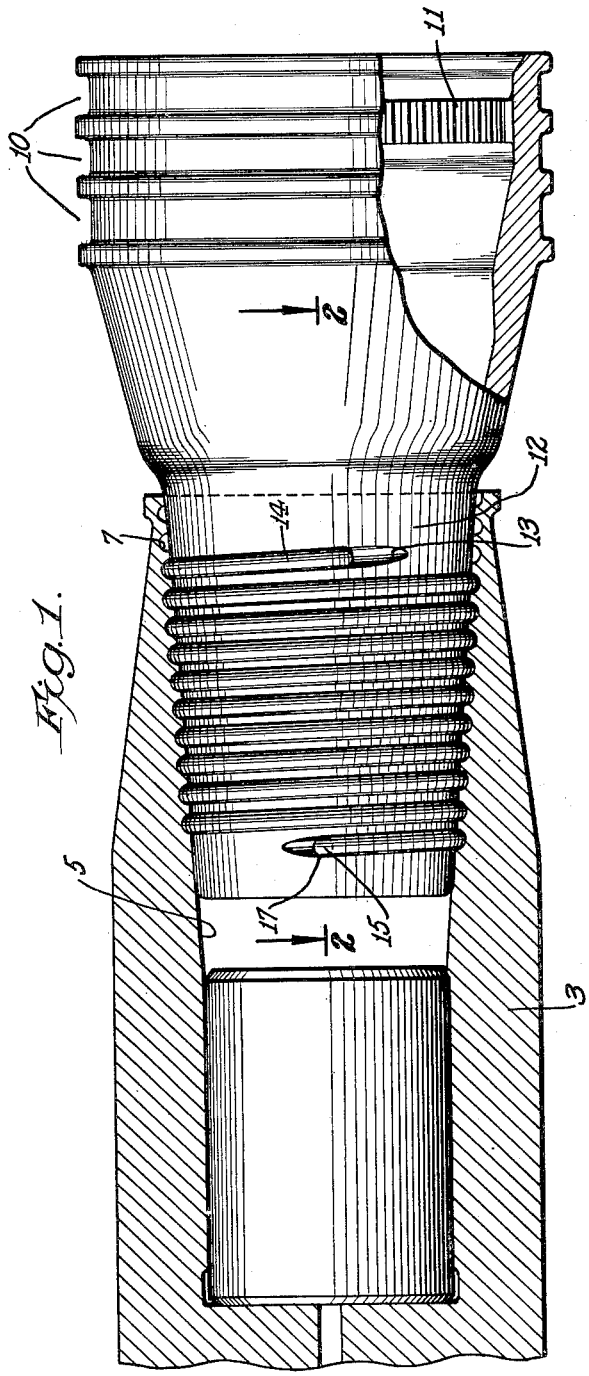
Figure 2:
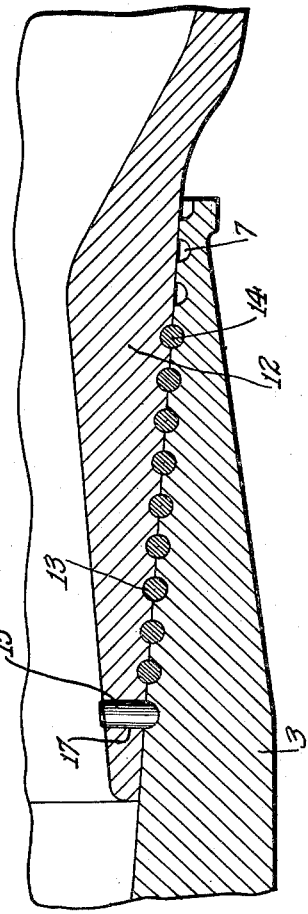

These and other objects of the invention and the means for their attainment will be more apparent from the following detailed description, taken in connection with the accompanying drawings illustrating one embodiment by which the invention may be realized and in which:

Figure 1 is a view, partly in section and partly in elevation, showing the butt portion of a propeller blade secured to a shank in accordance with this invention; and Fig. 2 is a fragmentary longitudinal sectional view taken in the plane indicated by the line 2—2 of Fig. 1, looking in the direction of the arrows.

The butt end or portion of the blade is indicated at 3. It is contemplated that this blade be made of metal, preferably an aluminum alloy, although other metals or alloys having the necessary characteristics are within the purview of the invention. The butt end or portion 3 of the blade is formed with an axial bore or recess 5 illustrated as having a frustro-conical entrance part tapering from a larger inside diameter at the extremity of the butt portion to a smaller inside diameter inwardly of the end thereof to provide a frusto-conical entrance part of the recess of substantial length. The recess may also have a substantially cylindrical inner part as shown in Fig. 1 for a purpose forming no part of the present invention.

The shank portion, which is to be united with the blade, is preferably of steel and has a frusto-conical portion or stub 12 substantially complementary with the entrance part of the recess in the butt portion 3 of the blade. It is shown as formed with ball races 10 and an internal gear 11 by which the shank, and therewith the blade, may be rotated.

Substantially the entire surface as shown of the entrance part of the bore 5 in the blade is formed with a helically grooved thread 7 commencing at a suitable point adjacent to the end of the butt and extending inwardly a suitable distance to receive the stub 12 of the shank portion and to provide a joint of adequate strength with the coacting shank portion 12. The tapering or frusto-conical shank portion or stub 12 is formed with a thread 13 of the same pitch as the thread 7 in the blade portion 3. While the grooves forming these threads may take any cross-sectional form, the grooves 7, in the preferred embodiment, are semi-circular in cross-section or at least formed with a rounded bottom to receive a flexible or deformable elongated member, such as a wire 14 which may be of circular cross section as shown, Fig. 2. This construction lends strength to the assembly under the various conditions met with in actual use.

In assembling the propeller blade portion on the shank portion, the wire 14 is first wound in the groove 13 of the male member or stub 12 to form the threads. Where the necessary equipment is available, the hub portion 3 of the blade is then forcibly screwed thereon.

This construction lends itself to assembly in the field. In the field, the blade and shank may be assembled by first cooling the shank and heating the blade. Then, when the two parts are assembled, a shrink fit between the parts is obtained. In such latter situation, of course, when the respective members, blade and shank, are at different temperatures, the pitch of the thread in the respective members will differ slightly. To compensate for such slight difference in pitch, in such a situation, one of the thread grooves, and preferably the inner thread groove, i. e. the groove 13 on the shank, is made slightly wider than the wire 14. Then upon relative movement of the grooves with respect to one another, the wire is movable in the wider groove to coincide with the position of the other groove.

If desired, the wire coil 14 may be anchored at the smaller end of the shank portion 12, as shown, by bending the end 15 of the wire 14 angularly with respect to the meeting surfaces of the parts and directing it into a radial recess 17 in the male member 12. As shown in Fig. 1 the groove 13 is somewhat longer than the wire 14, permitting the elongation of the latter within the groove during the assembly of the parts. By so anchoring the wire coil at the small end thereof and threading the wire onto the male member before the parts are assembled, frictional forces on the wire during assembly tend to contract the coil, and assembly of the blade on the shank is readily accomplished. On the other hand, any forces on the joint having a tendency to unscrew the joint is resisted because the wire, being anchored at only one end, acts to bind and seize the adjacent member. No other securing or tightening instrumentality for the connection is required.

If desired, the surface of the thread grooves in the shank may be cold worked, in a manner well understood in the art, to increase the fatigue limit thereof.

Also, if desired, the thread is of such a pitch that the tendency of the blade to go into a lower pitch will tend to turn the blade further on to the shank by the centrifugal torsion of the blade and thus serve to further tighten the joint thereby maintaining the joint tight during the operation of the propeller.

It will thus be seen that a propeller blade is provided wherein the blade portion is comprised of one material while the shank portion thereof may be comprised of a different material and these two portions, blade and shank, may be conveniently united together to form a strong joint in all situations in which the uniting operation must be performed and the uniting elements are so constructed and arranged as to resist disconnection between the united parts.

Various modifications will occur to those skilled in the art in the composition, configuration and disposition of the component elements going to make up the invention as a whole, and no limitation is intended by the phraseology of the foregoing description or illustrations in the accompanying drawings except as indicated in the appended claim.

What is claimed is:

In an air screw, a propeller blade having a butt portion, a recess extending into said butt portion substantially axially thereof and having a frusto-conical entrance part of substantial length, a shank for holding said blade having a frusto-conical portion substantially complementary with the entrance part of said recess and adapted to be secured therein, a substantially helical groove of predetermined pitch formed in and extending substantially the entire length of the entrance part of said recess and having a substantially semi-circular cross section; a substantially helical groove of similar and complementary cross section and pitch formed in the frusto-conical portion of said shank, a frusto-conical, substantially helical wire coil seated in said grooves and having its end at the smaller diameter end of said coil secured against rotation in said shank and the other end of said coil free to move along said grooves, the wire of said coil being of circular cross section, whereby said blade will be held rigidly on said shank upon assembly of the aforesaid parts.

ERLE MARTIN.
GLEN T. LAMPTON.
EDWIN E. VINCENT.

REFERENCES CITED

The following references are of record in the file of this patent:

UNITED STATES PATENTS

| Number | Name | Date |
| --- | --- | --- |
| 1,860,522 | Arnold | May 31, 1932 |
| 2,193,351 | Smith | Mar. 12, 1940 |
| 2,294,868 | Bottrill | Sept. 1, 1942 |
| 2,113,478 | Gobereau | Apr. 5, 1938 |
| 1,829,443 | Gobereau | Oct. 27, 1931 |
| 782,349 | Marshall | Feb. 14, 1905 |
| 2,246,568 | Berliner | June 24, 1941 |
| 1,780,825 | Kuhn | Nov. 4, 1930 |
| 1,119,973 | Mast | Dec. 8, 1914 |
| 2,150,876 | Caminez | Mar. 14, 1939 |
| 2,152,681 | Caminez | Apr. 4, 1939 |
| 2,150,875 | Caminez | Mar. 14, 1939 |

FOREIGN PATENTS

| Number | Country | Date |
| --- | --- | --- |
| 352,840 | Italian | Sept. 23, 1937 |